(12) United States Patent
Messerges et al.

(10) Patent No.: US 8,016,192 B2
(45) Date of Patent: Sep. 13, 2011

(54) USER-CONFIGURABLE PRIORITY LIST FOR MOBILE DEVICE ELECTRONIC PAYMENT APPLICATIONS

(75) Inventors: Thomas S. Messerges, Schaumburg, IL (US); Ruben R. Formoso, Weston, FL (US)

(73) Assignee: Motorola Mobility, Inc., Libertyville, IL (US)

( * ) Notice: Subject to any disclaimer, the term of this patent is extended or adjusted under 35 U.S.C. 154(b) by 894 days.

(21) Appl. No.: 11/448,241

(22) Filed: Jun. 6, 2006

(65) Prior Publication Data

US 2007/0278290 A1    Dec. 6, 2007

(51) Int. Cl.
*G06K 5/00* (2006.01)

(52) U.S. Cl. ............ 235/380; 235/379; 705/39; 705/41; 705/44

(58) Field of Classification Search .................. 235/375, 235/379, 380, 381; 705/1.26, 27, 28, 29, 705/35, 39, 40, 44
See application file for complete search history.

(56) References Cited

U.S. PATENT DOCUMENTS

| | | | | |
|---|---|---|---|---|
| 5,649,118 A * | 7/1997 | Carlisle et al. | ............... | 705/41 |
| 5,729,594 A * | 3/1998 | Klingman | ............... | 379/93.12 |
| 6,678,828 B1 * | 1/2004 | Pham et al. | ............... | 726/2 |
| 6,771,981 B1 * | 8/2004 | Zalewski et al. | ............... | 455/557 |
| 6,959,202 B2 * | 10/2005 | Heinonen et al. | ............... | 455/556.1 |
| 6,976,011 B1 * | 12/2005 | Capitant et al. | ............... | 705/67 |
| 7,024,174 B2 * | 4/2006 | Nagy et al. | ............... | 455/408 |
| 7,494,055 B2 * | 2/2009 | Fernandes et al. | ............... | 235/380 |
| 7,660,574 B2 * | 2/2010 | Niimi | ............... | 455/407 |
| 2002/0087478 A1 * | 7/2002 | Hudd et al. | ............... | 705/64 |
| 2002/0142751 A1 * | 10/2002 | Abe | ............... | 455/406 |
| 2004/0030601 A1 * | 2/2004 | Pond et al. | ............... | 705/16 |
| 2005/0006461 A1 | 1/2005 | Shenker | | |
| 2007/0255797 A1 * | 11/2007 | Dunn et al. | ............... | 709/217 |

* cited by examiner

*Primary Examiner* — Thien M. Le
*Assistant Examiner* — Christopher Stanford
(74) *Attorney, Agent, or Firm* — Ingrassia Fisher & Lorenz, P.C.

(57) ABSTRACT

A mobile device as disclosed herein can support a plurality of electronic payment applications such as credit and/or debit applications. During a payment transaction, the mobile device communicates a priority list of the electronic payment applications to a point of sale terminal, which then selects one of the applications for completion of the payment transaction, where the selection is governed by the priority list. The data structure corresponding to the priority list is configured such that the end user of the mobile device has management access rights to at least some of the electronic payment applications. Such end user management access rights can be used to modify the relative priority of the electronic payment applications.

15 Claims, 6 Drawing Sheets

| PRIORITY (402) | NAME (404) | PRIVATE (406) |
|---|---|---|
| 1 | ID 1 | N |
| 2 | ID 2 | N |
| ⋮ | ⋮ | ⋮ |
| N | ID N | N |
| N+1 | ID N+1 | N |
| N+2 | ID N+2 | Y |
| ⋮ | ⋮ | ⋮ |
| N+M | ID N+M | N |

| PRIORITY (502) | NAME (504) | ISSUER ACCESS (506) | END USER ACCESS (508) | PRIVATE (510) |
|---|---|---|---|---|
| 1 | ID 1 | Y | N | N |
| 2 | ID 2 | Y | N | N |
| 3 | ID 3 | Y | Y | Y |
| 4 | ID 4 | Y | Y | N |
| 5 | ID 5 | N | Y | Y |
| 6 | ID 6 | N | N | N |
| ⋮ | ⋮ | ⋮ | ⋮ | ⋮ |

| PRIORITY | NAME | ACCESS | PRIVATE |
|---|---|---|---|
| 4 | ID 3 | B | Y |
| 3 | ID 1 | B | Y |
| 5 | ID 5 | C | N |
| 1 | ID 2 | A | N |
| 2 | ID 4 | A | N |
| ⋮ | ⋮ | ⋮ | ⋮ |

USER-CONFIGURABLE PRIORITY LIST FOR MOBILE DEVICE ELECTRONIC PAYMENT APPLICATIONS

TECHNICAL FIELD

The present invention relates generally to mobile devices. More particularly, the present invention relates to a technique for controlling the priority of payment applications on a mobile device.

BACKGROUND

Consumers usually pay for goods and services with cash, credit cards, or debit cards. Stored value cards (such as gift cards or electronic gift certificates) and smart cards are becoming increasingly popular as alternative payment methods. When a bank or financial institution issues a physical payment transaction card, a logo or writing on the card indicates the brand of the payment application (e.g., MASTERCARD, VISA, etc.) and the issuing entity (e.g., CITIBANK, WELLS FARGO, etc.). Such cards usually represent a single payment application or, perhaps, a dual credit/debit application. The end user controls the use of his payment applications by physically selecting a card for use at the point of sale ("POS"). For dual credit/debit cards, the end user may also be able to select whether the credit card functionality or the debit card functionality is to be used at the POS. The end user knows which card to choose based on the logo or indicia printed on the card itself, while the selection of credit versus debit for a dual function card may be communicated to the POS clerk or entered at a POS terminal. These selection mechanisms are manual and somewhat limited because conventional payment cards do not include displays or any form of user interface.

Systems and protocols currently under development are seeking to port existing smart card and payment application technologies into handheld mobile devices such as cellular telephones. The goal of these systems and protocols is to enable an end user to store one or more payment applications on a mobile device such that, at the POS, the mobile device can be utilized as an electronic wallet. The mobile device wirelessly communicates the payment application data to the POS terminal, which then processes the payment transaction using a selected or designated payment application. In practice, most people carry more than one credit, debit, or payment card and, consequently, a mobile device with an electronic wallet should accommodate multiple electronic payment applications.

BRIEF DESCRIPTION OF THE DRAWINGS

A more complete understanding of the present invention may be derived by referring to the detailed description and claims when considered in conjunction with the following figures, wherein like reference numbers refer to similar elements throughout the figures.

FIG. 4 is an example data structure that includes priority information for electronic payment applications associated with a mobile device;

FIG. 5 is another example data structure that includes priority information for electronic payment applications associated with a mobile device;

FIG. 6 is yet another example data structure that includes priority information for electronic payment applications associated with a mobile device.

DETAILED DESCRIPTION

The following detailed description is merely illustrative in nature and is not intended to limit the invention or the application and uses of the invention. Furthermore, there is no intention to be bound by any expressed or implied theory presented in the preceding technical field, background, brief summary or the following detailed description.

The invention may be described herein in terms of functional and/or logical block components and various processing steps. It should be appreciated that such block components may be realized by any number of hardware, software, and/or firmware components configured to perform the specified functions. For example, an embodiment of the invention may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that the present invention may be practiced in conjunction with any number of data transmission protocols and that the system described herein is merely one exemplary application for the invention.

For the sake of brevity, conventional techniques and technologies related to mobile electronic devices, credit and debit card transaction processing, smart cards, electronic payment processing, wireless data communication, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in a practical embodiment.

Figure 3:
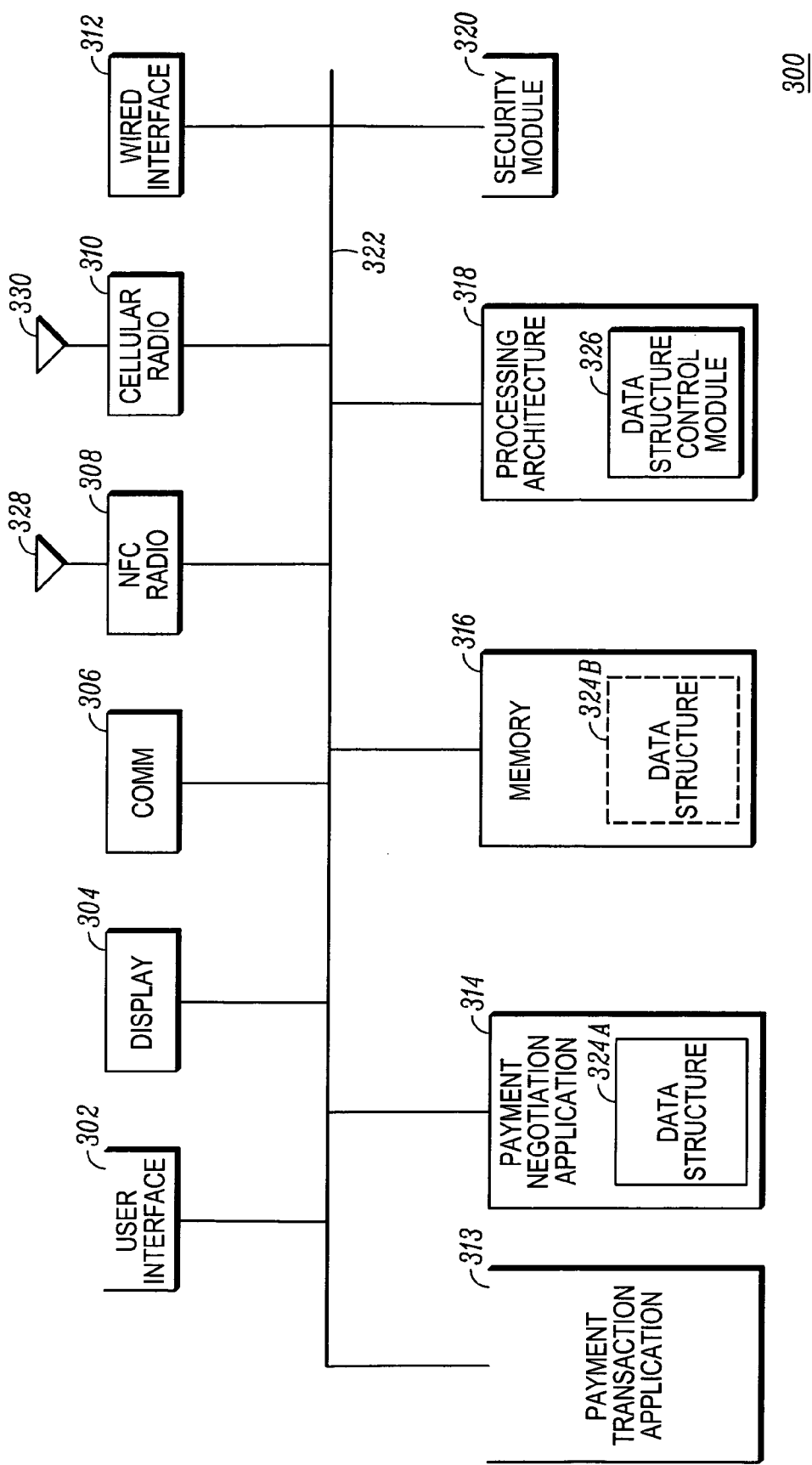
FIG. 3 is a schematic representation of an example mobile device that supports user-configurable electronic payment application priority.

The following description refers to elements or features being "connected" or "coupled" together. As used herein, unless expressly stated otherwise, "connected" means that one element/feature is directly or indirectly connected to another element/feature, and not necessarily mechanically. Likewise, unless expressly stated otherwise, "coupled" means that one element/feature is directly or indirectly coupled to another element/feature, and not necessarily mechanically. Thus, although the schematic shown in FIG. 3 depicts one example arrangement of elements, additional intervening elements, devices, features, or components may be present in an actual embodiment (assuming that the functionality of the device is not adversely affected).

Although the following description focuses on example embodiments that handle electronic payment applications that are utilized as payment mechanisms for purchases of goods, services, and the like, the technologies and techniques described herein are not so limited and an electronic transaction application may be suitably configured to support the communication, transfer, and processing of other types of data. An electronic payment application may correspond to: a credit account; a debit account linked to a savings account, a checking account, an investment account, or the like; a gift "card" or other stored value account; a pre-paid "card" or account; or the like. An electronic payment application may correspond to other applications that may be used during an electronic transaction, such as, without limitation: a loyalty or "points" account; a discount "card" or account; an identification "card" or mechanism; or the like.

It is desirable to have a system that combines the capabilities of very short range wireless communication and a secure platform to enable a financial service application, such as an electronic wallet, to be hosted on a handheld mobile device. One suitable short range wireless communication technology known as near field communication ("NFC") utilizes a carrier frequency in the 13 MHz range, along with relatively low bit rates. Other short range wireless communication technologies leverage magnetic induction techniques to support data transfer between two devices in close proximity to each other. Modern mobile devices (e.g., cellular telephones, personal digital assistants, digital media players, digital cameras, portable video game units, etc.) are typically rich in features, have large displays, include multifunctional user interfaces, and have generous data storage capacities, and a single mobile device can host multiple electronic transaction and payment applications.

A mobile device configured as described herein can manage a plurality of electronic payment applications and select one or more of the applications for use with any given transaction. In some cases, the end user should have complete control over the payment application priority (which is akin to a person selecting a physical credit/debit card for a transaction), while in other cases the issuer of the mobile device or the issuer of the electronic payment platform should have control over the payment application priority. For example, a cellular telephone issued and subsidized by Acme Bank may have a default setting that treats the Acme Bank credit card application as the first priority application. As another example, one might want a merchant's POS terminal to have the ability to select and access a payment card, a loyalty card, and a discount card from a prioritized list. In some cases, it may also be useful to have an identification card exposed to the POS terminal (e.g., when one purchases alcohol). The user might want to control which of these cards, as well as their relative priority, are available to the merchant (e.g., for privacy reasons) and, for example, the card issuer may require that a certain card always be presented so that the issuer can share in the revenue (e.g., a cellular service provider card—in order to provide a kickback to this service provider for every purchase made).

Figure 1:
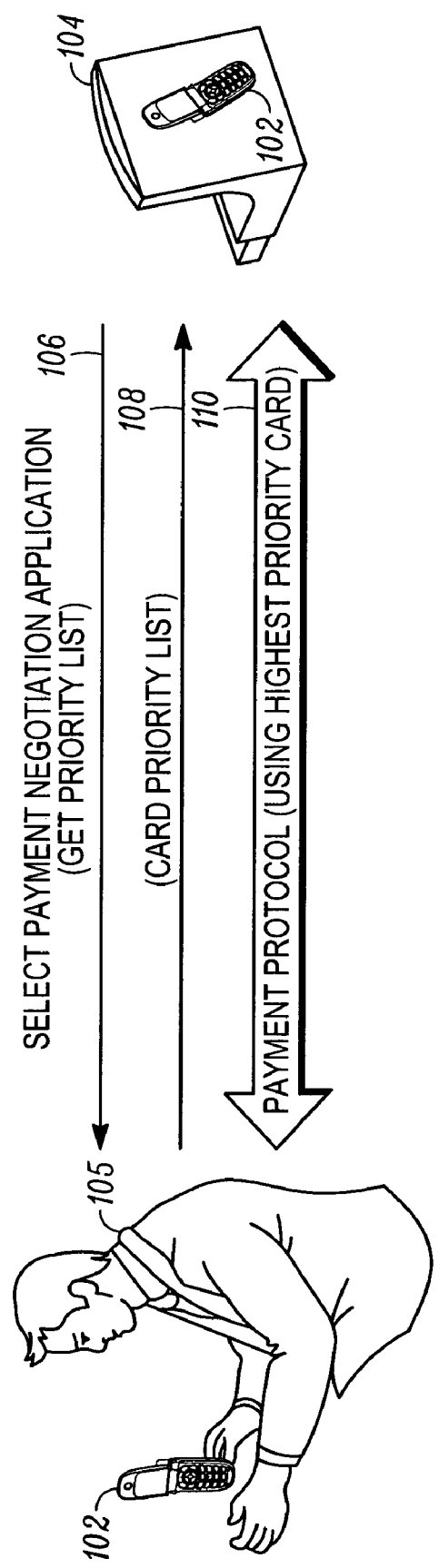
FIG. 1 is a diagram depicting an example electronic payment procedure that utilizes a mobile device as a payment mechanism.

FIG. 1 is a diagram depicting an example electronic payment procedure that utilizes a mobile device 102 as a payment mechanism at a POS terminal 104. In this example procedure, an end user 105 of mobile device 102 initiates near field communication between POS terminal 104 and mobile device 102 (alternate embodiments may employ different data communication techniques and protocols, such as a physical port connection, a smart card reader, or the like). The right side of FIG. 1 depicts end user 105 placing or waving mobile device 102 near POS terminal 104, which triggers the electronic payment procedure. After the near field communication channel has been established, POS terminal 104 may select or initialize a payment negotiation application that is installed on mobile device 102. In conjunction with this selection, POS terminal 104 solicits a prioritized list of electronic payment applications supported by or otherwise associated with mobile device 102. The arrow 106 in FIG. 1 represents the communication during which POS terminal 104 selects the payment negotiation application and during which POS terminal 104 requests the prioritized list from mobile device 102.

In response to the request from POS terminal 104, mobile device 102 generates and transmits a suitable response 108 back to POS terminal 104. In this example, response 108 includes a copy of the prioritized list (or any equivalent data structure that indicates priority for the electronic payment applications) in a format that can be received and processed by POS terminal 104. Once received, the priority list is processed by POS terminal 104 in an appropriate manner. For example, POS terminal 104 may analyze the electronic payment applications in order from the highest priority to the lowest priority to determine whether POS terminal 104 supports a particular electronic payment application. In practice, POS terminal 104 may select the highest priority electronic payment application that is accepted by the given merchant. After POS terminal 104 selects the electronic payment application to be used for the current transaction, a suitable payment protocol 110 is followed by POS terminal 104 to complete that transaction. Payment protocol 110 may complete the transaction using established electronic payment techniques that need not be described in detail herein. Multiple applications (e.g., credit card, loyalty card, etc.) may be selected and executed, in which case, payment protocol 110 may represent a bundle of transactions, one for each of these applications.

In this example, payment protocol 110 represents a protocol between mobile device 102 and POS terminal 104. This protocol typically would involve some sort of security mechanism (e.g., a challenge from POS terminal 104 and a response from mobile device 102) and would likely include the transfer of account information for the selected payment mechanism (e.g., the account number associated with the payment application could be sent from mobile device 102 to POS terminal 104). After mobile device 102 and POS terminal 104 engage in payment protocol 110, POS terminal may engage in another protocol with the appropriate financial institution (not shown) to determine whether the transaction should be approved. At this time the financial institution will check the status of the designated account (e.g., whether the user exceeded his credit limit, whether the card has been reported as lost, whether the card been flagged as fraudulent, etc.) and do other verifications. In this regard, POS terminal 104 may obtain "approved" or "disapproved" message from the financial institution.

The electronic payment procedure depicted in FIG. 1 provides a mechanism by which one of a plurality of electronic payment applications hosted on a mobile device can be selected for use by a POS terminal. In one example implementation, the priority list is "read-only" such that the end user is unable to modify the relative priority of any of the electronic payment applications. In such an implementation, the issuer of the mobile device (or the issuer of the payment transaction platform) may retain access privileges to change the relative priority of the applications using a secure communication channel. In the example embodiment described below, however, the end user can access some or all of the priority list for purposes of modifying the relative priority of the applications. Thus, a practical implementation may be suitably configured to contemplate three potential models: (1) the issuer has full control of electronic payment application priorities; (2) the issuer delegates full control of electronic payment application priorities to the end user; or (3) the issuer delegates partial control of electronic payment application priorities to the end user. As used herein, an "issuer" generally refers to a person, a software application, a company, or any entity that has the necessary security credentials and authentication information (passwords, keys, identification numbers, etc.) required to obtain access to the priority list in the manner described herein.

Figure 2:
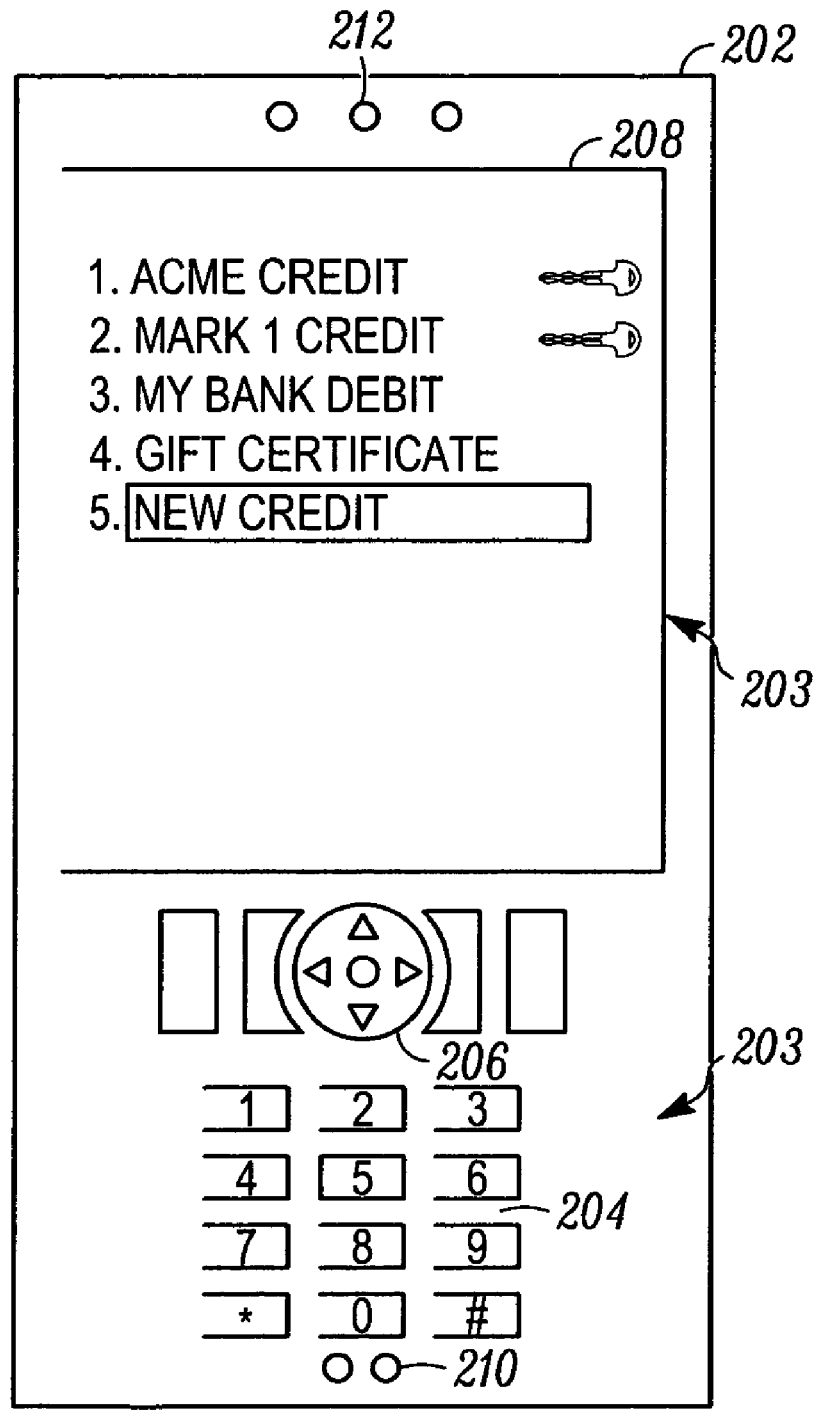
FIG. 2 is a face view of an example mobile telephone that supports user-configurable electronic payment application priority.

FIG. 2 is a face view of an example mobile telephone 200 that supports user-configurable electronic payment application priority as described herein. Mobile telephone 200 is one example implementation of mobile device 102 shown in FIG. 1. Mobile telephone 200 may incorporate a number of conventional features and functionality that will not be described in detail herein, including, without limitation: telecommunication; still camera; video camera; digital media player; video game player; personal digital assistant; or the like. Mobile telephone 200 generally includes a housing 202 and a user interface 203. User interface 203 may include, without limitation: a keypad 204; a navigation button 206; a display 208; a microphone 210; and a speaker 212. User interface 203 may also include or be configured to function as, without limitation: a touch pad; a touch screen (on display 208); a stylus pad (on display 208); a cursor pointing device; or the like. User interface 203 enables the user of mobile telephone 200 to manipulate applications and features supported by mobile telephone 200 such as, for example, a payment negotiation application as described in more detail below. In this regard, user interface 203 may be suitably configured to produce end user instructions to modify a current priority of electronic payment applications associated with mobile telephone 200.

FIG. 2 depicts an example screen shot on display 208, where the screen shot conveys the priority of the electronic payment applications in a list format. The actual manner and format in which this information is displayed may vary from one mobile device to another, and the particular screen shot in FIG. 2 is not intended to limit or otherwise restrict the scope or application of the example embodiments in any way. In this example, mobile telephone 200 supports five different electronic payment applications, and the screen shot lists them in order of priority (one being the highest priority and five being the lowest priority). Mobile telephone 200 may display an appropriate icon, such as a key as shown in FIG. 2, that indicates that the priority of the corresponding electronic payment application is locked and cannot be changed by the end user (the icon may also indicate that other attributes of the corresponding application are write protected, e.g., the ability to modify existing access rights, application names, ability to delete applications, etc.). In this example, the first two electronic payment applications are locked. As described in more detail below, the priority of the remaining three electronic payment applications may be modified by the end user. The end user can manipulate user interface 202 to change the priority of the unlocked electronic payment applications (alternatively, the end user can implement such changes via the internet, via a wired connection to a computing device, or the like). In one embodiment, the end user can select a desired electronic payment application in the list and manipulate user interface 203 in an appropriate manner to change the priority of the selected entry. In this regard, FIG. 2 depicts the fifth entry in a highlighted manner to indicate that it has been selected by the end user.

As an example, each unlocked application could be manipulated using three soft keys or other user interface features. One key or button, labeled "Move Up" or identified with an upward arrow, could be used to move the selected application up one priority level. Another key or button, labeled "Move Down" or identified with a downward arrow, could be used to move the selected application down one priority level. Another key or button, labeled "Make Private" or "Make Public" (depending on the current state), would remove or add the selected application to the priority list sent to the POS terminal. Private applications could be rendered in gray text or be marked with a special icon (similar to how the "key icon" indicates locked applications in FIG. 2).

FIG. 3 is a schematic representation of an example mobile device 300 that supports user-configurable electronic payment application priority as described herein. Mobile device 300 may be realized as mobile device 102, mobile telephone 200, as a personal digital assistant, as a digital media player, as a pocket personal computer, or the like. Mobile device 300 generally includes: a user interface 302; a display 304; a communication module 306; a near field communication ("NFC") radio 308; a cellular radio 310; a wired interface 312 (which may be optional in a practical implementation); a payment transaction application 313; a payment negotiation application 314; a suitable amount of memory 316; a processing architecture 318; and a security module 320. Some or all of these elements may be coupled together with a bus 322 or any suitable interconnection arrangement or architecture. Mobile device 300 may also include a suitably formatted data structure 324 that indicates priority for a plurality of electronic transaction applications associated with mobile device 300, and a data structure control module 326 that is configured to manage access to the data structure 324. In accordance with one example embodiment, payment transaction application 313, payment negotiation application 314, data structure 324, and data structure control module 326 may reside within the security module 320, while the user interface software for payment transaction application 313, payment negotiation application 314, data structure 324, and data structure control module 326 may reside in the main processor for mobile device, e.g., processing architecture 318. An example embodiment of mobile device 300 may include additional elements, components, features, and/or functionality associated with conventional operating aspects, and such conventional aspects will not be described in detail herein.

User interface 302 may be generally configured as described above for user interface 203 (see FIG. 2). In this example, user interface 302 is coupled to data structure control module 326 to facilitate updating of data structure 324 using the technologies and techniques described herein. Display 304 may be generally configured as described above for display 208 (see FIG. 2). In particular, mobile device 300 may manipulate display 304 to render a list or other indication of the priority of electronic payment applications supported by mobile device 300.

In an example embodiment, processing architecture 318 may be realized with any number of hardware, software, and/or firmware components, and processing architecture 318 may include any number of logical or functional modules. Processing architecture 318 may be implemented or performed with a general purpose processor, a content addressable memory, a digital signal processor, an application specific integrated circuit, a field programmable gate array, any suitable programmable logic device, discrete gate or transistor logic, discrete hardware components, or any combination designed to perform the functions described here. A processor may be realized as a microprocessor, a controller, a microcontroller, or a state machine. Moreover, a processor may be implemented as a combination of computing devices, e.g., a combination of a digital signal processor and a microprocessor, a plurality of microprocessors, one or more microprocessors in conjunction with a digital signal processor core, or any other such configuration.

In practice, processing architecture 318 may be suitably configured to perform and/or support the various operations, features, techniques, functions, and operations described herein. In this example, processing architecture 318 includes or cooperates with data structure control module 326, which manages access to (and modification of) data structure 324. Moreover, although FIG. 3 depicts certain elements as distinct blocks or modules, processing architecture 318 may include or incorporate additional functional components (or portions thereof) of mobile device 300, such as communication module 306, wired interface 312, or security module 320.

Memory 316 may be realized as RAM memory, flash memory, EPROM memory, EEPROM memory, registers, a hard disk, a removable disk, a CD-ROM, or any other form of storage medium known in the art. In this regard, memory 316 can be coupled to processing architecture 318 such that processing architecture 318 can read information from, and write information to, memory 316. In the alternative, memory 316 may be integral to processing architecture 318. As an example, processing architecture 318 and memory 316 may reside in an ASIC. In this example, memory 316 may be utilized to store data structure 324b (depicted in dashed lines to indicate that storage in memory 316 may be an optional feature), authentication keys utilized by security module 320, data associated with the various electronic transaction applications supported by mobile device 300, and other information that may relate to conventional operating features of mobile device 300.

Communication module 306 may represent processing logic that is suitably configured to support the data communication protocols, schemes, and techniques utilized by mobile device 300. In practice, communication module 306 or a portion thereof may be considered to be part of processing architecture 318. For simplicity, FIG. 3 depicts one communication module 306. An example embodiment, however, may include any number of communication modules. Communication module 306 may be configured to: process data received or transmitted by cellular radio 310; process data received or transmitted by NFC radio 308; process data received or transmitted by wired interface 312; and/or process data received or transmitted by other technologies and techniques supported by mobile device 300.

For wireless communication of data, communication module 306 may support any number of suitable wireless data communication protocols, techniques, or methodologies, including, without limitation: RF; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Frequency Hopping Spread Spectrum; cellular/wireless/cordless telecommunication protocols; wireless home network communication protocols; paging network protocols; magnetic induction; satellite data communication protocols; wireless hospital or health care facility network protocols such as those operating in the WMTS bands; GPRS; and proprietary wireless data communication protocols such as variants of Wireless USB.

For communication of data over a cable, a wired connection, or other physical link, communication module 306 may support any number of suitable data communication protocols, techniques, or methodologies, including, without limitation: Ethernet; home network communication protocols; USB; IEEE 1394 (Firewire); hospital network communication protocols; and proprietary data communication protocols.

NFC radio 308 may cooperate with communication module 306 to support wireless near field communication. NFC radio 308 may include hardware, software, and/or firmware configured to support NFC communication with a POS terminal. NFC radio 308 may include any number of RF front end components, any number of transmitters, any number of receivers, and/or any number of transceivers, depending upon the particular implementation. NFC radio 308 may be coupled to a suitably configured antenna 328 which may (but need not) be internal to the housing of mobile device 300. NFC radio 308 utilizes RF carrier frequencies in the 13.54 MHz range and communicates data at a relatively low bit rate in the range of 106, 212, and 424 kilobits per second. Notably, NFC radio 308 need not rely on a cellular communication cellular network, an 802.11 network, or other non-NFC networks to communicate with the POS terminal. NFC can be used to emulate a proximity card and thus support proximity payment applications, access control, e.g., a badge for door access, and others. In addition, NFC can also operate in reader or writer mode, giving an NFC-enabled device the ability to read or write to tags as well as proximity cards. An example embodiment of mobile device 300 may utilize NFC radio 308 to communicate data structure 324 to a POS terminal.

Cellular radio 310 may cooperate with communication module 306 to support cellular communication using known techniques and technologies. Cellular radio 310 may include hardware, software, and/or firmware configured to support communication with a cellular network. Cellular radio 310 may include any number of RF front end components, any number of transmitters, any number of receivers, and/or any number of transceivers, depending upon the particular implementation. Cellular radio 310 may be coupled to a suitably configured antenna 330 which may (but need not) be internal to the housing of mobile device 300. In example embodiments, cellular radio 310 may be utilized to enable an issuer or an administrator to remotely access and manage payment negotiation application 314 and/or data structure 324.

Wired interface 312 may cooperate with communication module 306 to support data communication with other devices using a tangible link, e.g., a cable, a wired connection, or a mechanical connection such as a docking port, a plug, or a contact element. Wired interface 312 may include hardware, software, and/or firmware configured to support communication with external devices. In an example embodiment, wired interface 312 may include or be realized as a suitably configured and formatted port, connector, jack, plug, receptacle, socket, adaptor, or the like. An example embodiment of mobile device 300 may utilize wired interface 312 to communicate data structure 324 to a POS terminal.

Although not shown in FIG. 3, mobile device 300 may include additional components that are designed to support other data communication schemes and protocols. For example, mobile device 300 may include an NFC element that is configured to support near field magnetic inductance communication with an external device such as a POS terminal. As another example, mobile device 300 may include one or more additional wireless communication modules that are specifically designed to support IrDA, Bluetooth, ZigBee (and other variants of the IEEE 802.15 protocol), IEEE 802.11 (any variation), IEEE 802.16 (WiMAX or any other variation), wireless USB, or the like. An example embodiment of mobile device 300 may utilize such additional components to communicate data structure 324 to a POS terminal.

Security module 320, which may be realized as hardware, software, and/or firmware, is suitably configured to manage access to payment negotiation application 314, data structure 324, and/or data structure control module 326. In practice, security module 320 or a portion thereof may be considered to be a part of processing architecture 318. In one example embodiment, security module 320 is realized as a processor (e.g., a smart card processor) that is used for hosting (not just managing access to) payment negotiation application 313, payment transaction application 314, data structure control module 326, data structure 324, and any cryptographic keys associated with these elements in its memory. In such an embodiment, processing architecture 318 could be used for hosting the normal mobile device software, such software associated with the operation of user interface 320. An alternate embodiment (which is mentioned below) might include the functions of security module 320 within processing architecture 318 (i.e., a single ASIC or secured CPU).

In one example embodiment, security module 320 establishes a secure channel between mobile device 300 and a POS terminal during payment transactions to ensure that the transfer of data structure 324 remains protected. Likewise, security module 320 may establish a secure over-the-air channel between mobile device 300 and an issuer or administrator to ensure that such external access remains secure. Security module 320 may also require the end user to enter a password, a key, or a PIN before granting end user access to data structure 324, payment negotiation application 314, or data structure control module 326. Thus, security module 320 can authenticate the end user prior to providing end user management access to data structure 324. Security module 320 may leverage suitable technologies and techniques to ensure that only authorized persons and/or external devices obtain access to certain features of mobile device 300. Such technologies and techniques may include, without limitation: authentication; encryption; tamper-resistant hardware; and the like.

Payment transaction application 313 is suitably configured to handle the payment transactions initiated by mobile device 300. Payment transaction application 313, which is installed on mobile device 300, provides the overall feature set and functionality that enables mobile device 300 to perform electronic transactions with a POS terminal. Payment transaction application 313 may include or be compatible with commercial applications such as the PAYPASS application available from MASTERCARD, the BLINK application available from CHASE, or the like. Payment transaction application 313 may include applications such as electronic loyalty cards or electronic identification cards. In all of these cases, payment transaction application 313 cooperates with the POS to support transactions as described herein.

Payment negotiation application 314, data structure 324, and data structure control module 326 cooperate to enable the end user to access and manage the priority of electronic payment applications supported by mobile device 300. In one example embodiment, payment negotiation application 314 is installed on the mobile device 300 itself. In other embodiments, payment negotiation application 314 may be installed on a SIM card, a memory card, or other removable storage media that is coupled to or received by the mobile device 300.

Payment negotiation application 314 is involved in the configuration of the priorities and providing the information to the POS, while payment transaction application 313 is the actual application used for the payment procedure. Payment negotiation application 314 is generally designed to manage "electronic wallet" transactions where multiple electronic payment applications reside on mobile device 300. Payment negotiation application 314 is suitably configured to support the electronic payment procedure described above in connection with FIG. 1. In this regard, payment negotiation application 314 can provide data structure 324 (which represents the priority list for the electronic payment applications) when requested by a POS terminal, and payment negotiation application 314 can provide access to data structure 324 when an authenticated end user or issuer desires to modify data structure 324. In one example embodiment, payment negotiation application 314 is compliant with the suite of specifications published by credit card associations or manufacturers of POS terminals.

In one example embodiment, data structure 324 is realized in payment negotiation application 314. In other words, data structure 324 is integrated with (or is closely linked to) payment negotiation application 314. In FIG. 3, data structure 324a represents this integrated embodiment. In another example embodiment, data structure 324 is accessible to payment negotiation application 314, but data structure 324 need not be realized in payment negotiation application 314. In FIG. 3, data structure 324b represents this alternate embodiment.

In one example embodiment, the ability to manage the priority list is enabled via payment negotiation application 314. A suitable command, for instance, a "CONFIGURE" command, can be added to payment negotiation application 314. The behavior of the CONFIGURE command may depend on the authentication status of mobile device 300. For example, if the platform issuer has been authenticated, then the CONFIGURE command can be used to set the relative priority and otherwise manage the attributes of the electronic transaction applications supported by mobile device 300. If the end user has been authenticated, the CONFIGURE command can be used to only manage the attributes of the specified entries in the priority list. In practice, the CONFIGURE command could be implemented and modeled after a typical smart card STORE_DATA command.

Data structure control module 326 may be suitably configured to perform and/or support the various operations, features, techniques, functions, and operations described herein. For example, data structure control module 326, which may be realized in processing architecture 318 and/or in payment negotiation application 314, is configured to provide issuer management access to data structure 324 as needed, and to provide end user management access to a subset (i.e., some or all) of data structure 324 as needed. Issuer management access enables an issuer to modify the relative processing priority of the electronic transaction applications maintained in data structure 324. Such issuer management access may also enable an issuer to manage other attributes of the electronic transaction applications and/or data structure 324, including, without limitation: adding new electronic transaction applications to data structure 324; deleting existing electronic transaction applications from data structure 324; renaming existing electronic transaction applications in data structure 324; changing issuer management access rights corresponding to existing electronic transaction applications in data structure 324; or changing end user management access rights corresponding to existing electronic transaction applications in data structure 324.

As described in more detail below, the end user management access enables the end user of mobile device 300 to modify the priority of the electronic payment applications corresponding to the particular subset of data structure 324. As mentioned above in the description of mobile device 200, user interface 202 can be manipulated by the end user to produce end user instructions that are processed by data structure control module 326 to update data structure 324 with a changed priority scheme. Such end user management access may also enable the end user to manage other attributes of the electronic transaction applications and/or data structure 324, including, without limitation: adding new electronic transaction applications to data structure 324; deleting existing electronic transaction applications from data structure 324;

renaming existing electronic transaction applications in data structure 324; or changing end user management access rights corresponding to existing electronic transaction applications in data structure 324.

In example embodiments, data structure control module 326 may also be configured to protect a portion of data structure 324 to prevent end user management access to that portion. Indeed, data structure control module 326 can be utilized to grant full end user access to data structure 324, to grant limited end user access to data structure 324, to grant limited issuer or administrator access to data structure 324, to grant full issuer or administrator access to data structure 324, etc.

FIGS. 4-6 depict example data structures that include priority information for electronic transaction applications associated with a mobile device. Data structure 324 in FIG. 3 may be arranged as shown in these figures, or it may be arranged in an alternate format. The specific configuration, format, and arrangement of data structure 324 may vary to suit the needs of the particular system deployment; data structure 324 generally indicates priority, access rights (e.g., issuer and/or end user rights), and visibility (e.g., whether this application included in the priority list is sent to the POS terminal) for multiple electronic payment applications listed in data structure 324 and supported by mobile device 300.

Data structure 400 (see FIG. 4) includes an ordered list of the different electronic payment applications, where the ordering reflects the relative priority of the applications. In this regard, the priority influences selection of one of the electronic payment applications for use during a payment transaction initiated by the mobile device. In this example, the prioritized list of the electronic payment applications includes a priority designation 402, an application name 404, and a privacy designation 406 for each entry. Priority designation 402 may be a number (as shown), a letter, or any data representing the relative priority of the corresponding application. Here, the number one represents the highest priority, the number two represents the second highest priority, and so on. The priority designation 402 "N+M" represents the lowest priority application in this example. Application name 404 may be a word, a number, an alphanumeric string, or any data representing the respective electronic payment applications. Privacy designation 406 may be a letter (as shown), a number, or any data representing whether the corresponding application is private or public. In this context, a private application may be one that is not sent to the POS terminal, one that requires end user confirmation before it is sent to the POS terminal, one that has restrictions on its visibility, or the like. As mentioned above in the description of the electronic payment procedure of FIG. 1, a POS terminal may process data structure 400, which in this context represents a payment application selection order for use during a payment transaction. The POS terminal may be suitably configured to conduct the transaction using the electronic payment application having the highest possible priority.

Data structure 400 may be partitioned into different groups, portions, or subsets having different characteristics as described herein. For example, data structure 400 may include a protected portion 408 that is locked or otherwise secured to prevent end user management access to protected portion 408. The shaded section of data structure 400 corresponds to protected portion 408. Data for the electronic payment applications identified in protected portion 408 may be accessible to an authenticated issuer or administrator having certain privileges to modify the priority of the applications in protected portion 408. In contrast, a subset 410 of data structure 400 may be accessible to an authenticated end user for purposes of end user management of the priority of the electronic payment applications corresponding to subset 410. In this example, subset 410 is a proper subset of data structure 400, i.e., subset 410 includes less than all of the entries in the priority list. In alternate embodiments, subset 410 need not be a proper subset of data structure 400, i.e., the mobile device may provide end user management access to all of the entries in the priority list. Although not depicted in FIG. 4, one or more of the electronic payment applications in subset 410 may also be accessible to an authenticated issuer or administrator having issuer/administrative privileges.

Data structure 400 is arranged such that each electronic transaction application corresponding to protected portion 408 is of higher priority than any electronic transaction application corresponding to subset 410. In other words, the lowest entry in protected portion 408 (corresponding to priority designation "N") has a higher priority than the highest entry in subset 410 (corresponding to priority designation "N+1"). Such an arrangement may be desirable to enable a platform issuer to promote or encourage use of one or more electronic payment applications.

Data structure 500 (see FIG. 5) also includes a prioritized list of the different electronic payment applications. In this example, data structure 500 includes a priority designation 502, an application name 504, an issuer access field 506, an end user access field 508, and a privacy designation 510 for each entry. Priority designation 502, application name 504, and privacy designation 510 may have the characteristics described above in connection with the same fields in data structure 400. Issuer access field 506 includes data that indicates whether an issuer/administrator has access (which may be regulated using authentication techniques) to the corresponding entry for purposes of modifying its relative priority. In this example, issuer access has been granted for the electronic transaction applications named ID1, ID2, ID3, and ID4, and issuer access has not been granted for the electronic transaction applications named ID5 and ID6. End user access field 508 includes data that indicates whether an end user has access (which may be regulated using authentication techniques) to the corresponding entry for purposes of modifying its relative priority. In this example, end user access has been granted for the electronic transaction applications named ID3, ID4, and ID5, and end user access has not been granted for the electronic transaction applications named ID1, ID2, and ID6. The ellipses in FIG. 5 indicate that an embodiment of data structure 500 can have any number of entries, which may be more or less than six.

The data contained in issuer access field 506 and end user access field 508 may identify groups, portions, or subsets of data structure 500, where a given group, portion, or subset may have the desired access characteristics. In particular, issuer access field 506 and end user access field 508 may include data that determines whether an issuer and/or an end user can modify the priority of a particular electronic transaction application. In this regard, it may be desirable to: provide issuer access to a given electronic transaction application, while protecting that application to prevent end user access thereto (e.g., the applications named ID1 and ID2); provide both issuer access and end user access to a given electronic transaction application (e.g., the applications named ID3 and ID4); provide end user access to a given electronic transaction application, while protecting that application to prevent issuer access thereto (e.g., the application named ID5); or protect a given electronic transaction application to prevent both issuer access and end user access to that application (e.g., the application named ID6). If other entities in the system exist, then an additional column in data structure 500 may be included for each additional entity to indicate the access privileges associated with each entity.

The relative priority of the electronic transaction applications identified in data structure 500 may, but need not, be related to the data contained in issuer access field 506 and/or end user access field 508. In data structure 500, for example, electronic transaction applications having issuer access and no end user access have the highest priority relative to other application types, electronic transaction applications having both issuer access and end user access have the second highest priority relative to other application types, electronic transaction applications end user access and no issuer access have the second lowest priority relative to other application types, and electronic transaction applications having no issuer access and no end user access have the lowest priority relative to other application types.

Data structure 600 (see FIG. 6) also includes a list of the different electronic payment applications. The ellipses in FIG. 6 indicate that an embodiment of data structure 600 can have any number of entries, which may be more or less than five. In this example, data structure 600 includes a priority designation 602, an application name 604, an access category field 606, and a privacy designation 608. Priority designation 602, application name 604, and privacy designation 608 may have the characteristics described above in connection with the same fields in data structure 400. In this example, however, the entries in data structure 600 need not result in any specific ordering of the priority designation 602.

Access category field 606 includes data that indicates the type of access rights corresponding to the particular electronic transaction application, e.g., issuer management access and end user management access granted, only issuer management access granted, only end user management access granted, or no management access at all. These four different access scenarios may be distinguished in any practical manner. This example uses different letter designations for the different access scenarios. In data structure 600, a first management access category ("A") has been assigned to the electronic transaction applications named ID2 and ID4, a second management access category ("B") has been assigned to the electronic transaction applications named ID3 and ID1, and a third management access category ("C") has been assigned to the electronic transaction application named ID5. The relative priority of the electronic transaction applications identified in data structure 600 may, but need not, be related to the data contained in access category field 606.

Figure 7:
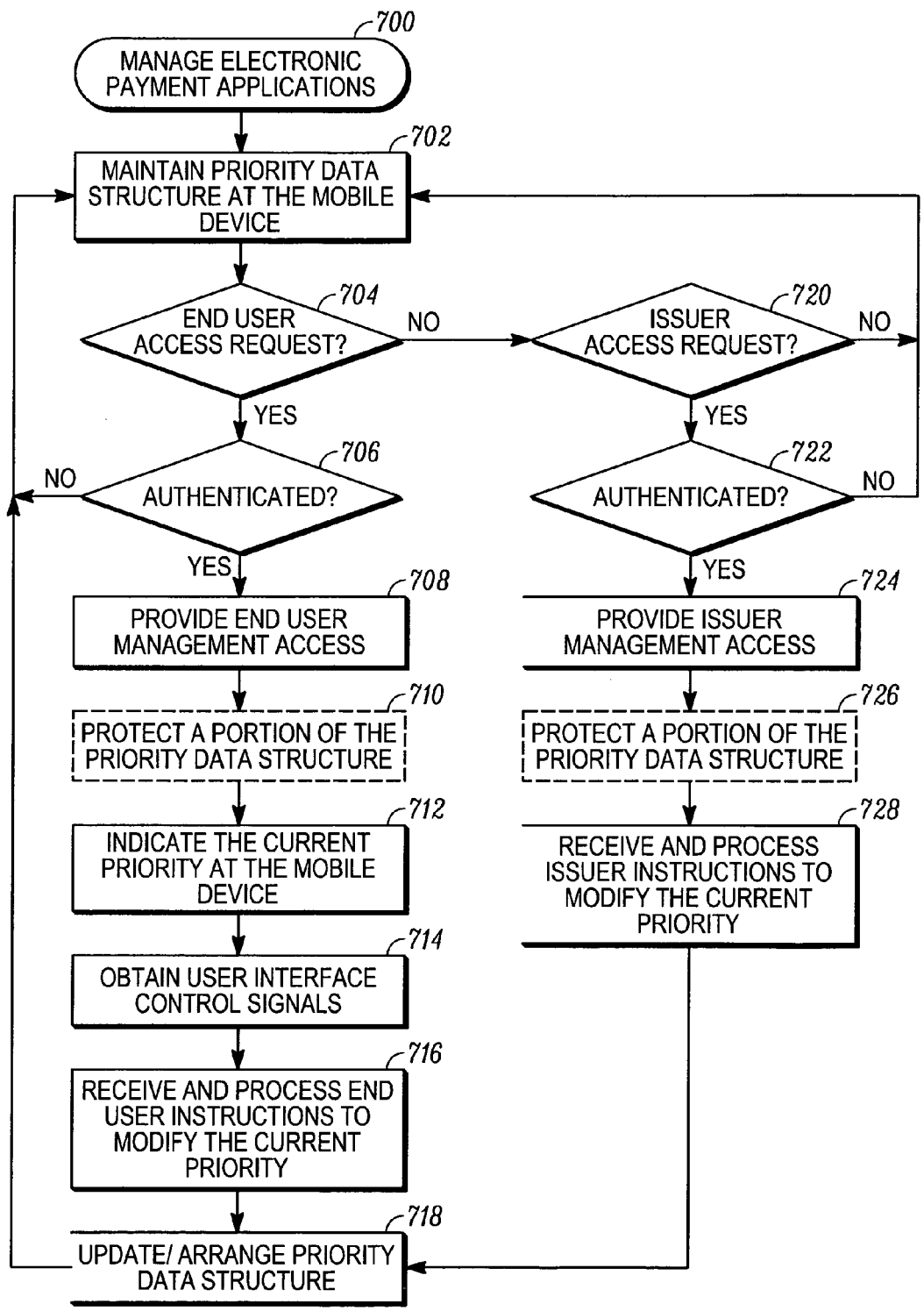
FIG. 7 is a flow chart of an example process for managing electronic payment applications associated with a mobile device.

FIG. 7 is a flow chart of an example process 700 for managing electronic payment applications associated with a mobile device. The various tasks performed in connection with process 700 may be performed by software, hardware, firmware, or any combination thereof. For illustrative purposes, the following description of process 700 may refer to elements mentioned above in connection with FIGS. 1-6. In practical embodiments, portions of process 700 may be performed by different elements of the described system, e.g., a mobile device or operating elements thereof. It should be appreciated that process 700 may include any number of additional or alternative tasks, the tasks shown in FIG. 7 need not be performed in the illustrated order, and process 700 may be incorporated into a more comprehensive procedure or process having additional functionality not described in detail herein.

Process 700 assumes that the mobile device and the system environment in which the mobile device operates are configured to support the electronic transaction procedures described above. In this example, the mobile device is configured to support electronic payment transactions using a plurality of electronic payment applications (e.g., credit card accounts, loyalty cards, discount cards, or the like). Accordingly, the mobile device may maintain a data structure that indicates priority for a plurality of electronic payment applications associated with the mobile device (task 702). The following description of process 700 refers to this data structure as a priority data structure. If the mobile device receives an end user access request (query task 704), then process 700 may proceed to a query task 706. In practice, an end user access request may be responsive to an entry made at the user interface of the mobile device, responsive to the manipulation of a software application executed by a computing device coupled to the mobile device, responsive to over-the-air control signals authorized by the end user, or the like. If the mobile device receives an issuer access request (query task 720), then process 700 may proceed to a query task 722. In practice, an issuer access request may be responsive to an entry made at the user interface of the mobile device, responsive to the manipulation of a software application executed by a computing device coupled to the mobile device, responsive to over-the-air control signals authorized by the issuer, or the like. If the mobile device does not receive an end user access request or an issuer access request, then process 700 may be re-entered at task 702.

Assuming that an end user access request has been received, process 700 may perform a suitable authentication procedure to authenticate an end user prior to providing end user management access to the priority data structure. In this regard, query task 706 determines whether the end user has been authenticated. If the end user is not authenticated, then process 700 may end or it may be re-entered at task 702. If the end user is authenticated, then process 700 may establish a secure data communication channel and provide end user management access to a subset of the data structure (task 708). As mentioned above, this subset may be a proper subset of the data structure or it may be the entire data structure, depending upon the particular configuration and current settings. If only partial end user management access is granted, then process 700 may protect a portion of the data structure to prevent end user management access to that portion (task 710). FIG. 7 depicts task 710 in dashed lines as an indication of its optional nature. Different protection schemes may be implemented by an embodiment of process 700, as described above in connection with FIGS. 4-6.

In this example, process 700 indicates the current priority of the electronic payment applications at the mobile device (task 712). Referring to FIG. 2, process 700 may generate a suitable display at the mobile device, and the display may include the current priority of all hosted electronic payment applications, or any portion thereof. For example, the display may only include the electronic payment applications for which the end user has management access rights. In other embodiments, task 712 may indicate the current priority elsewhere or in an alternate manner to facilitate user management access. For example, the current priority may be printed in a tangible form, it may be broadcast in an audible form at the mobile device, or it may be generated at a display for a computing device (a personal digital assistant, a computer, a mobile device configuration terminal, test equipment, or the like) that communicates with the mobile device via a physical and/or a wireless link.

Process 700 may then receive or otherwise obtain control signals that include, represent, or correspond to end user instructions (task 714). The control signals may, for example, be obtained from a user interface of the mobile device. Alternatively, the control signals may be obtained from a remote device or system. In practice, the control signals are generated when the end user wishes to modify the priority data structure in some manner. Thus, process 700 can receive and process the end user instructions (task 716) conveyed in the control signals. In this example, the end user instructions represent instructions to modify a current priority of electronic payment applications in at least a portion of the data structure. In other words, the end user instructions are intended to change the relative priority of at least one electronic payment application associated with the mobile device. In response to the end user instructions, process 700 updates the data structure and arranges the data structure in the desired prioritized manner (task 718). In one example embodiment, the data structure is realized in a payment negotiation application that is installed on the mobile device, and the updating of the data structure modifies at least a portion of the payment negotiation application without reinstalling the payment negotiation application on the mobile device. In other words, task 718 may simply update or modify a suitable data structure accessed or maintained by the payment negotiation application without having to completely replace the payment negotiation application. Following task 718, process 700 may end or be re-entered at task 702.

Referring again to query task 720, an issuer access request may be responsive to an entry made at the user interface of the mobile device by an authorized person, responsive to the manipulation of a software application executed by a computing device coupled to the mobile device, responsive to over-the-air control signals authorized by the issuer and/or by the end user, or the like. Assuming that an issuer access request has been received, process 700 may perform a suitable authentication procedure to authenticate the issuer prior to providing issuer management access to the priority data structure. In this regard, query task 722 determines whether the issuer has been authenticated. If the issuer is not authenticated, then process 700 may end or it may be re-entered at task 702. If the issuer is authenticated, then process 700 may establish a secure data communication channel and provide issuer management access to at least a portion of the data structure (task 724). If only partial issuer management access is granted, then process 700 may protect a portion of the data structure to prevent issuer management access to that portion (task 726). FIG. 7 depicts task 726 in dashed lines as an indication of its optional nature. Different protection schemes may be implemented by an embodiment of process 700, as described above in connection with FIGS. 4-6. In a practical embodiment, the current priority list for the mobile device may be indicated or displayed to an issuer representative or an administrator as needed.

Eventually, process 700 can receive and process issuer instructions to modify the current prioritization of the electronic payment applications in an appropriate manner (task 728). Process 700 may also enable the issuer to add one or more new electronic payment applications to the data structure and/or delete one or more electronic payment applications from the data structure. In certain embodiments, tasks 720, 722, 724, 726, and/or 728 may be performed without the involvement or knowledge of the end user. The generation and handling of issuer instructions and control signals may be similar to that described above in connection with end user management access. Briefly, the issuer instructions may represent instructions to modify a current priority of electronic payment applications in at least a portion of the data structure. In response to the issuer instructions, process 700 updates the data structure and arranges the data structure in the desired prioritized manner as described above (task 718).

A mobile device and/or a mobile device environment as described above can perform process 700 to enable an end user of the mobile device to manage the priority list of electronic transaction applications hosted by the mobile device. In practice, this allows the end user to manage electronic payment applications in much the same way as one manages the selection of physical credit/debit cards for a given transaction.

While at least one example embodiment has been presented in the foregoing detailed description, it should be appreciated that a vast number of variations exist. It should also be appreciated that the example embodiment or embodiments described herein are not intended to limit the scope, applicability, or configuration of the invention in any way. Rather, the foregoing detailed description will provide those skilled in the art with a convenient road map for implementing the described embodiment or embodiments. It should be understood that various changes can be made in the function and arrangement of elements without departing from the scope of the invention as set forth in the appended claims and the legal equivalents thereof.

What is claimed is:

1. A method for managing electronic transaction applications for a mobile device of an end user, the mobile device issued by an issuer, the method comprising:
    maintaining, at the mobile device, a data structure that indicates priority for a plurality of electronic transaction applications associated with the mobile device, wherein a first portion of the data structure is protected to prevent end user management access to the first portion, a second portion of the data structure is unprotected to allow end user management access to the second portion, the first portion comprises a first subset of the electronic transaction applications prioritized by the issuer, and the second portion comprises a second subset of the electronic transaction applications prioritized by the user;
    providing the end user with management access to the second portion of the data structure;
    receiving end user instructions to modify a current priority of electronic transaction applications in the second portion of the data structure, the end user instructions being obtained from a user interface of the mobile device;
    the mobile device updating the data structure in response to the end user instructions; and
    arranging the data structure such that each electronic transaction application in the first subset is of higher priority than any electronic transaction application in the second subset.

2. A method according to claim 1, further comprising providing issuer management access to the first portion of the data structure.

3. A method according to claim 1, further comprising providing issuer manager access to the second portion of the data structure.

4. A method according to claim 1, further comprising authenticating an end user prior to providing end user management access to the second portion of the data structure.

5. A method according to claim 1, wherein:
    the data structure is realized in a payment negotiation application installed on the mobile device; and
    updating the data structure comprises modifying a portion of the payment negotiation application without reinstalling the payment negotiation application on the mobile device.

6. A method according to claim 1, wherein:
    each of the plurality of electronic transaction applications is a payment application; and
    the data structure represents a payment application selection order for use during a payment transaction.

7. A method according to claim 1, further comprising:

indicating, at the mobile device, the current priority of electronic transaction applications in the second subset; and obtaining control signals from a user interface of the mobile device, the end user instructions corresponding to the control signals.

8. A method according to claim 1, wherein the second subset is a proper subset of the data structure.

9. A mobile electronic device configured to be issued by an issuer, the mobile electronic device comprising:

a user interface configured for manipulation by an end user of the mobile electronic device;

a payment negotiation application;

a data structure accessible to the payment negotiation application, the data structure including data representing a plurality of electronic payment applications and data representing priority of the plurality of electronic payment applications, the priority influencing selection of only one of the plurality of electronic payment applications for use during a single purchase transaction, wherein a first portion of the data structure includes a first subset of the electronic payment applications prioritized by the issuer, and wherein a second portion of the data structure includes a second subset of the electronic payment applications prioritized by the user;

a data structure control module coupled to the data structure, the data structure control module being configured to provide issuer management access to the first portion of the data structure, to prevent end user management access to the first portion, and to provide the end user with management access to the second portion of the data structure, the end user management access enabling the end user of the mobile device to modify the priority of the electronic payment applications corresponding to the second portion of the data structure, by manipulating the user interface; and the data structure being arranged such that each electronic payment application in the first subset is of higher priority than any electronic payment application in the second subset.

10. A mobile electronic device according to claim 9, wherein the user interface is coupled to the data structure control module, the user interface being configured to produce end user instructions to modify a current priority of electronic payment applications corresponding to the second portion of the data structure, wherein the data structure control module is configured to update the data structure in response to the end user instructions.

11. A mobile electronic device according to claim 10, the user interface being configured to display the priority of the electronic payment applications corresponding to the second portion of the data structure.

12. A mobile electronic device according to claim 9, further comprising a security module coupled to the data structure control module, the security module being configured to authenticate an end user prior to providing end user management access to the second portion of the data structure.

13. A mobile electronic device according to claim 9, wherein:

the data structure is realized in the payment negotiation application; and the data structure control module is configured to modify the priority of the electronic payment applications corresponding to the second portion of the data structure without reinstalling the payment negotiation application.

14. A mobile electronic device according to claim 9, the data structure comprising a prioritized list of the plurality of electronic payment applications.

15. A mobile electronic device according to claim 9, wherein the second portion of the data structure is a proper subset of the data structure.

* * * * *